Dec. 30, 1969  G. A. WALTERS  3,487,277
DYNAMIC SERVOMECHANISM REVERSAL SYSTEM
Filed Sept. 19, 1966  3 Sheets-Sheet 1

INVENTOR.
GLENN A. WALTERS
BY *Carl R. Brown*
   *attorney*

Dec. 30, 1969    G. A. WALTERS    3,487,277
DYNAMIC SERVOMECHANISM REVERSAL SYSTEM
Filed Sept. 19, 1966    3 Sheets-Sheet 2

INVENTOR.
GLENN A. WALTERS
BY Carl R. Brown
Attorney

Dec. 30, 1969  G. A. WALTERS  3,487,277
DYNAMIC SERVOMECHANISM REVERSAL SYSTEM
Filed Sept. 19, 1966  3 Sheets-Sheet 3

INVENTOR.
GLENN A. WALTERS

United States Patent Office 3,487,277
Patented Dec. 30, 1969

3,487,277
DYNAMIC SERVOMECHANISM REVERSAL SYSTEM
Glenn A. Walters, La Jolla, Calif., assignor to Cubic Corporation, San Diego, Calif., a corporation of California
Filed Sept. 19, 1966, Ser. No. 580,226
Int. Cl. H02k 7/11; H02p 3/10
U.S. Cl. 318—136                    1 Claim

ABSTRACT OF THE DISCLOSURE

A dynamic servomechanism reversal system in which the dynamic capabilities of the motor in reversing the mechanism and accelerating the reversed mechanism to the speed of the motor, are aided by means of a programmed, positioned, spring-loaded stop.

---

In servomechanism drive systems it is often desirable to actuate a driven member in a reciprocating motion at a constant velocity between two determinable limits of travel. When the driven member reaches each limit of its travel, it is necessary to decelerate the load of the driven member, stop it, and then accelerate the driven member by reversal of its direction to drive it toward the other limit of travel at the desired constant velocity. The force which is required to decelerate, stop, and accelerate a load during such reversal of directions is much greater than the force required to maintain constant velocity of the driven member while being driven through the distance of travel between the two limit points.

Thus, ordinarily such a servomechanism drive system demands a significantly increased power capacity which may take the form of an electric motor, for instance, to adequately cope with the inertial problems presented by the moving load. Also, much heavier components such as gear boxes and other mechanical linkages are required for substantially the same reasons when the drive mechanism is required to absorb the kinetic energy of the driven load.

In the past, numerous devices and arrangements have been proposed to overcome the problems involved in decelerating, stopping, and accelerating a driven member in an opposite direction. For instance, one such proposed system utilizes the concept of a change of rate of drive when the driven member reaches a point near its limits of travel so as to reduce, insofar as possible, the kinetic energy of the driven member and the problems resulting from its inertia. Other systems have employed varieties of braking means in order to effect deceleration and stopping of the driven member at the limits of its travel and its reciprocating motion.

Such braking means may be of mechanical, electrical, or electro mechanical types and are in general relatively costly; they also add complexity to the system and often involve maintenance problems due to mechanical wear, as well. Such schemes for braking, while helpful in dissipating the inertial energy of the driven member, do not contribute toward the necessary acceleration of the driven member in the opposite direction after it has been decelerated and stopped at the limit of its travel.

Accordingly, it is a primary object of the present invention to provide a servomechanism drive system which is significantly more efficient, simpler, and less costly than prior art systems designed to accomplish comparable results.

Another primary object of the present invention is to provide a dynamic servomechanism reversal system which converts the kinetic or inertial energy of the driven member to potential energy and to employ that potential energy to help accelerate the driven member in the opposite direction after it has been stopped at the limit of its travel in a reciprocating motion.

Yet another object of the present invention is to provide a dynamic servomechanism reversal system which inherently minimizes the requirement for extra heavy duty components to absorb the inertial energy of the driven member when it is decelerated and stopped at a limit of its reciprocating motion.

A further object of the present invention is to provide such a servomechanism system whose unique concept is readily adaptable to embodiments using various forms of resilient means such as mechanical, compressible fluids, and hydraulic arrangements.

In its fundamental form the concept of the present invention contemplates a dynamic servomechanism reversal system for controlling a driven member in a reciprocating motion in opposite directions between determinable limits of travel. A reversible driving means, such as a reversible electric motor or a hydraulic vane motor, is operably connected to drive the drive member which typically may take the form of a radar antenna scanning a determinable sector of variable width having a selected orientation. The control means are provided for reversing the reversible driving means when the driven member is proximate to each of the determinable limit of travel. This control means may take the form of a scan programmer as is well known in the art so that the size of the sector scan as its orientation may be chosen, predetermined, or changed as desired. Such control means operates to decelerate the driven member by reversing the actuating energy supplied to the reversible driving means. For example, if a two phase reversible electric motor is employed, the phase of the electrical energy supplied to one of the windings of the motor is reversed, thus decelerating the motor and tending to reverse its direction of operation. When a hydraulic vane motor is employed to drive the driven member under the control of the servomechanical system, the direction of flow of the hydraulic fluid supplied to the motor is appropriately changed to brake its driving action and reverse its direction of drive.

In accordance with the concept of the present invention, additionally there is provided a resilient means which is responsive to the actuation of the above described cotnrol means for absorbing the kinetic energy of the driven member between the point of actuation of the control means and each of the determinable limits of travel, storing that kinetic energy in the form of potential energy, and then expending the stored potential energy in reversing the direction of drive of the driven member.

Those skilled in the art will appreciate that rather than merely dissipating the initial kinetic energy of the driven member, the present invention contemplates absorbing that energy, converting it to a form of potential energy and then arranging that such potential energy is expended in the useful and desirable purpose of reversing the direction of drive of the driven member. As was previously mentioned, the resilient means contemplated by the present invention may take a mechanical form such as a spring means, for instance, or it may take the form of a compressible fluid, such as a gas or air, or yet the further form of a substantially non-compressible fluid such as a hydraulic liquid which is contained within an enclosure of a compliant nature so that the compliance of the enclosure effectively absorbs the kinetic energy transmitted through the non-compressible fluid and employs such potential energy to effect the reversal of direction of the driven member when the enclosure returns to its original shape, size and form by reason of its compliant nature.

These and other features, advantages, and objects of the present invention will be better understood from the

3 description of several of its embodiments together with the associated drawings and its scope will be more particularly pointed out in the appended claim.

Figure 1:
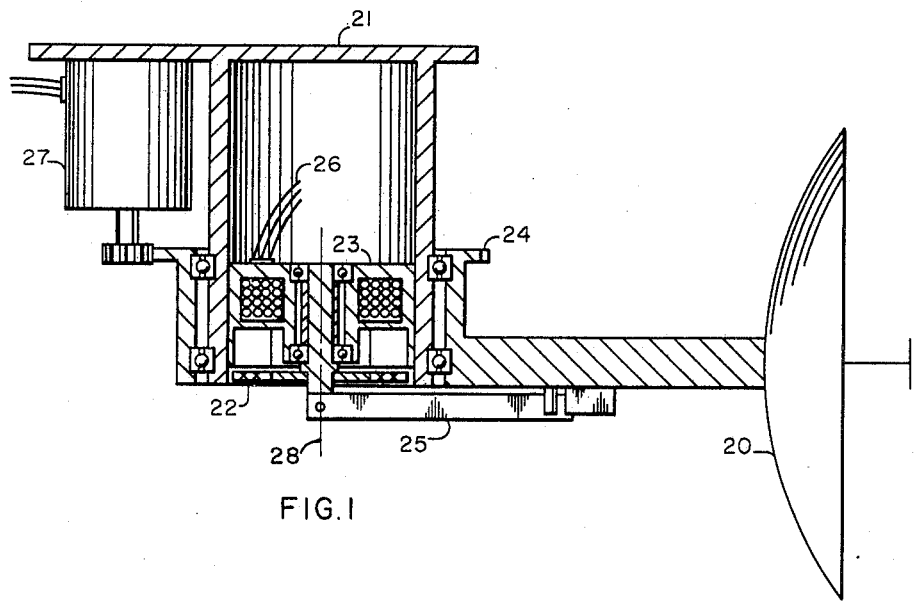
FIGURE 1 is a partially cross-sectional view of an embodiment of the present invention wherein the dynamic servomechanism reversal system drives a radar antenna.

Referring now to FIGURE 1, there is shown a typical embodiment of the present invention having a form of electro-mechanical driving means used to drive a radar antenna 20. A housing 21 is fixedly supported and a combination of apparatus is mounted thereon through appropriate bearing means to drive the radar antenna 20 through a selectively determinable sector scan directed in an orientation which likewise is arranged to be selectively determinable as desired. Included in the assembly supported by member 21 is electro-magnetic brake means comprising a stator 23 and a brake rotor 22. The radar antenna 20 is supported on the arm of a structure including a large gear means 24 rotatably supported on the structure 21 by appropriate bearings as illustrated. Thus the brake rotor 22 is free to move with the stator structure 23 and is mechanically linked to the scan structure 24 through a resilient spring means 25. The electromagnetic brake means is controlled through connections 26 in a conventional manner. In normal operation, the entire structure 24 is driven through appropriate gear linkage with a reversible electric motor 27 which is fixedly supported on the structure 21. Accordingly, when current is supplied to the electro-magnetic brake means through the connections 26 to lock the brake, the moving support structure 24 is mechanically linked to the stationary structure 21 through the spring 25. The moving support structure 24 is then reversed by motor 27 and spring 25.

Figure 2:
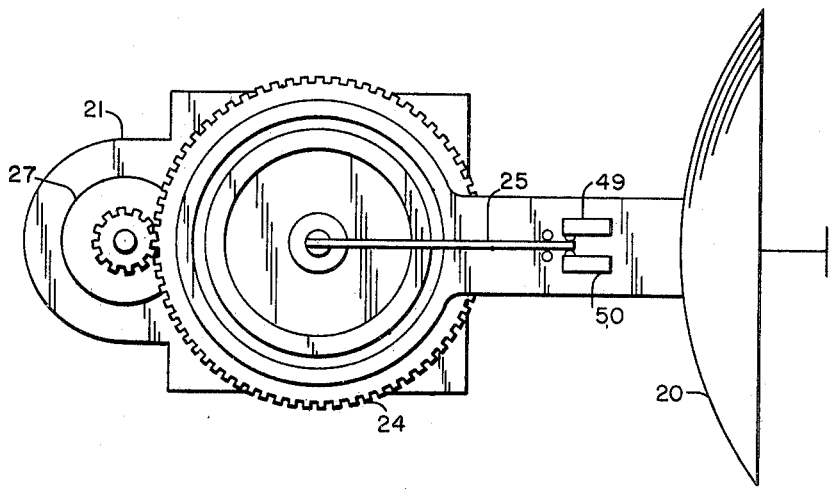
FIGURE 2 is a bottom view of the embodiment of FIGURE 1.

FIGURE 2 shows a bottom view of the assembly of FIGURE 1 and more clearly illustrates the relationship between the spring 25 and switch means 49 and 50 disposed on the rotating structure which supports the antenna 20. As illustrated, the structure 21 fixedly supports a motor 27 which is mechanically linked through appropriate gears to the driven structure 24. Normally, when the driven structure 24 is moving between the determinable limits of travel, the spring 25 is in its unsprung position as shown in FIGURE 2. However, when the driven structure 24 (supporting the switch means 49 and 50) approaches one of the limits of its reciprocating travel, the motor 27 is reversed and the electro-magnetic brake means is actuated for a short period of time, engaging the stator 23 with the brake 22 and stopping the rotation of the spring 25 about the axis 28.

Figure 3:
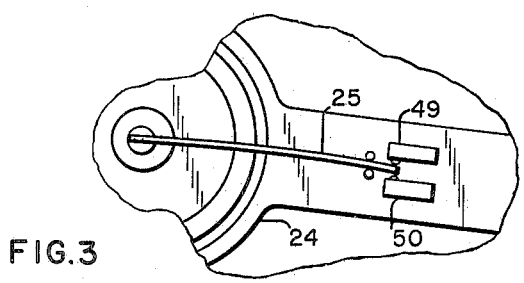
FIGURE 3 is a detailed view of the operation of the resilient means of the present invention as included in FIGURES 1 and 2 when the driven member reaches a point proximate to one of the limits of reciprocating travel.
Figure 4:
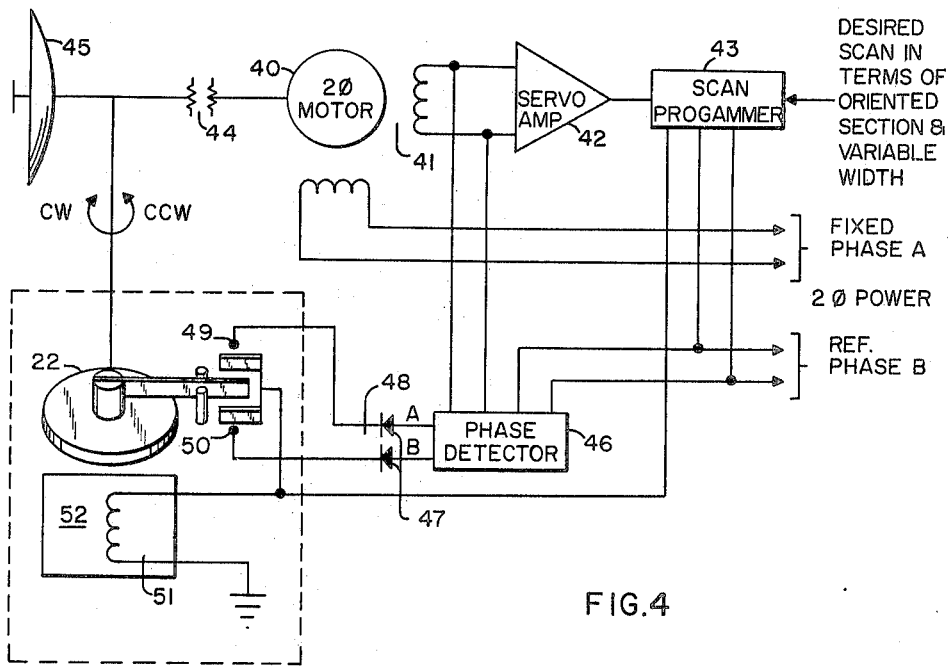
FIGURE 4 is a schematic wiring diagram of the embodiment of FIGURES 1, 2, and 3.

Assuming that the driven structure 24 is rotating in a clockwise direction when viewed as in FIGURE 2, the spring means 25 will be deformed by setting the brake means in a curvature as shown in FIGURE 3, and acting upon the switch means 49 and 50 in a manner which will be described more fully hereinafter. Referring now to FIGURE 4, there will be seen a schematic diagram illustrating an entire system of the present invention including a driven member in the form of a radar antenna

4

45 comparable to the radar antenna 20 of FIGURES 1 and 2. In FIGURE 4, a driving means comprising a two phase electrical motor 40 is shown schematically as being actuated by two windings, one of which is energized by a fixed phase A of an electrical source and the other of which is energized through an appropriate winding 41 by a reversible phase B of an electrical source under the control of a known scan programmer 43 and a known servo amplifier 42. A phase detector 46 detects the phase relationship of the control phase of electrical energy in winding 41 relative to the phase of reference phase B of electrical energy, and produces an output 47 at diodes A and B providing a form of D.C. control signal to the switch means 49 and 50. The switch means 49 and 50 is in turn connected to a winding 51 of an electro-magnetic brake means 52. (The rotor bears the same numerical designation as it did in FIGURES 1 and 2.)

In operation, the driven member 45, shown in the form of a radar antenna, is driven through appropriate gear means 44 by the shaft output of a two phase motor 40. The motor 40 is reversible by reversing the phase of the electrical energy supplied to the control winding 41 which is accomplished through conventional servomechanism amplifier circuitry 42 and the conventional scan programmer 43 in a manner known in the art. The known scan programmer 43 has known controls to set a given scan width in terms of sector scan as well as a means of orienting the selected sector width in any direction as may be desired. Thus, the driven member 45 can be directed in any orientation and caused to reciprocatingly scan any desired width of sector about such orientation.

A phase detector 46 detects the phase of the electric energy applied to the control windings 41 of the reversible drive motor 40 relative to the reference phase of electrical energy and provides an output at 48 commensurate with the relative phase relationship of two A.C. input voltages received as illustrated. When the reference and control voltages are in phase, the output potential developed at A is positive and the output developed at B is negative relative to ground. When the phase of the control winding voltage is reversed, the sign of the two outputs at A and B are commensurately reversed, output A becoming negative and output B becoming positive. The outputs from phase detector 46 after passing through the diodes 47, are connected to switch means 49 and 50 which may take the form of conventional limit switches.

Figure 5:
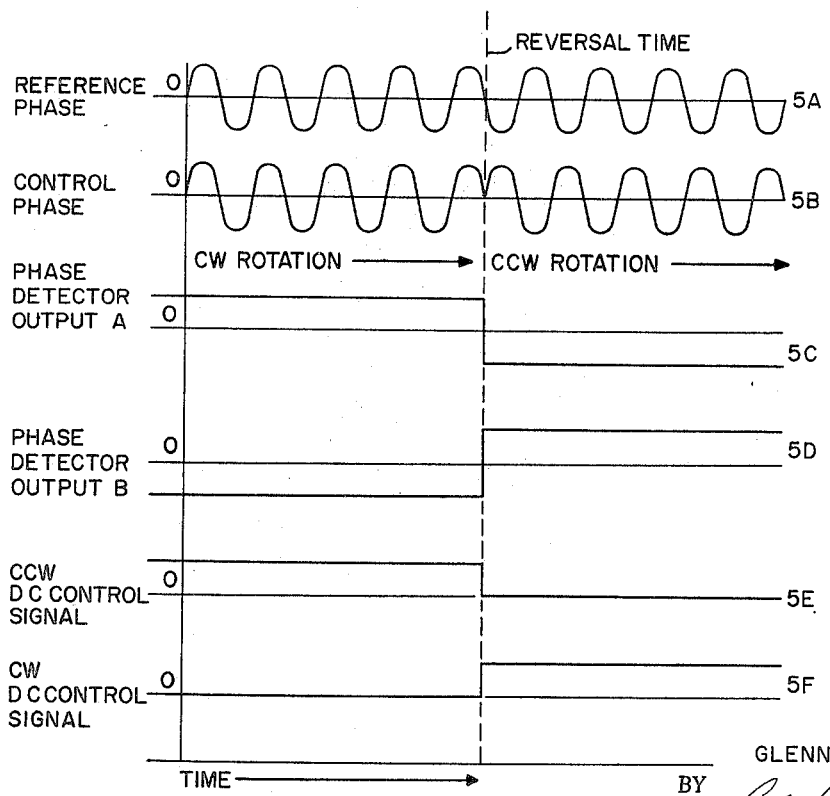
FIGURE 5 is a graphic illustration of the several electrical waveforms developed in operation of the embodiment as schematically represented in FIGURE 4.

In typical operation, it may be assumed that the driven member 45 is moving in a clockwise direction as schematically illustrated in the orientation of FIGURE 4. Thus, as is illustrated in FIGURE 5 the waveforms of the reference phase as shown by wave form 5A is "in phase" with the control phase electrical energy as illustrated by waveform 5B. As the clockwise rotation reaches a point proximate to a determinable limit of desired travel, the scan programmer 43 and servo amplification means 42 effect reversal of the phase of the control electrical energy in the known manner as is illustrated by the right hand portion of waveform 5B. Accordingly, the output of phase detector 46 changes from a positive potential to a negative potential as is illustrated by waveform 5C.

The phase detector output B is responsive to change from a negative potential to a positive potential, as illustrated by waveform 5D. Concurrently with the reversal of the control phase electrical energy and thus revesral of motor 40, the solenoid 51 of the electromagnetic brake means receives a signal through line 55 of the appropriate polarity that engages the solenoid and sets the brake which operates to stop the rotation of rotor 22. The signal in line 55 from the scan programmer has only a relatively short pulse duration as programmed into the known scan programmer. When the signal in line 55 terminates, a solenoid 51 energizing circuit has taken over. The switches 49 and 50 can be closed in two ways.

These two ways can be used together or separately. As may be seen in FIGURE 2, the end of spring 25 is slightly against the two switches but is not closing the switches. Usually the friction in the bearing supporting the stator structure can be made sufficient to bend spring 25 in rotation of the antenna 20 to have a shape as shown in FIG. 3. In this position the bent spring end closes switch 50. Thus when the phase detector 46 reverses phase through diode B, a voltage of the correct potential feeds through closed switch 50 to energize the brake solenoid 51 and sets the brake. Once the brake is set, the antenna 45 (or 20 in FIGURES 1, 2 and 6) continues to rotate from its momentum against the force of spring 25 and the force of the motor 40 that now, being reversed, is trying to reverse the movement of the antenna 45. The combined force of the bent spring 25 and the motor 40, stops the antenna 45 and starts the antenna 45 moving in the opposite or counter-clockwise direction. The electro magnetic brake is still set during this period of time. When the antenna 45 has moved a sufficient distance in the counter-clockwise direction, then the spring 25 straightens out and is then bent in the opposite direction. Thus switch contact 49 is now closed and switch contact 50 is open. Since there has not been a change in the phase relationship of the signal to the phase detector, the potential on closed contact 49 does not have the correct polarity to energize hte brake 52. Thus the signal through line 45 has terminated, usually while the antenna 45 is still moving in a clockwise direction, and the opening of switch 50 de-energizes the braking circuit. The antenna 45 then rotates with spring 25 to the stop at the other end of the rotating arc as set by the scan programmer, where the rotation of the antenna 45 is again reversed in the same manner. In addition, when the scan programmer reverses the phase of the control electrical energy, the scan programmer also provides a pulse through line 55 to winding 52 sufficient to momentarily energize solenoid 52 and stop rotor 22. This actuation of the brake mechanism causes spring 25 to also bend in the same direction as shown in FIGURE 3 to close switch 50 and thus hold the brake mechanism energized. The pulse 55 makes sure that the brake 52 is set at the correct time, even though the spring 25 is not bent just by rotation of the antenna 45 as previously described and as illustrated in FIGURE 3. The driven member and its associated structure continues to move due to inertial energy. The spring 25 is deformed to a greater extent in the manner previously described in connection with FIGURE 3, absorbing the kinetic energy of the driven member to a point where the combination force of the motor 27 and the bent spring 25 are sufficient to reverse the direction of movement of the antenna structure. The bent spring now releases its stored force, which force and the force of the motor rapidly accelerate the reversed movement of the antenna structure. When the spring has returned to its unbent condition, then the antenna structure is moving at the desired speed as determined by the driving force of motor 27. As previously stated, at this point switch 50 is released and opened, solenoid 52 de-energized and brake rotor 22 released. Because of the aforesaid friction in the brake mechanism support bearings, then spring 25 is bent in the other direction closing switch 49 in preparation for setting the brake at the other end of the selected sector width. In this manner, the stored potential energy, in the form of a deformed spring, is released to initiate the acceleration of the driven member in the opposite direction. Thus, the two D.C. control signals operate to energize and hold the electro-magnetic brake means at appropriate points substantially coincident with the predetermined limits of travel of the driven member developing wave forms as indicated at 5E and 5F of FIGURE 5 and the pulse in line 55.

It will be understood by those skilled in the art, that embodiments of the present invention may be readily effected employing a spring means such as that illustrated in FIGURES 1 and 2 without the use of an electromagnetic brake to set the spring. However, when such an arrangement is employed, it will be obvious to those knowledgeable in the art that there is a restriction on the selectability of orientation of scan as well as the width of the sector which may be scanned, inasmuch as such an arrangement will depend upon the fixed points of engagement of the spring rather than the selectively operative points as are afforded by the arrangement of the movable rotor 22 in the embodiment described in FIGURES 1, 2, 3, and 4. The election to employ the resilient means of the present invention with or without the electro-magnetic brake or comparable means to aid in deceleration of the drive member, will depend largely upon the requirements of the particular apparatus to which the concepts of the present invention are applied.

However, it will be apparent to those skilled in the art that the concept of the present invention is such that in either case of the variant embodiments described, the resilient means effectively absorbs the kinetic energy of the driven members, converts such kinetic energy to potential energy, and thereafter usefully employs the stored potential energy with the force of the reversed motor to aid in the acceleration of the driven member in the opposite direction so that it reaches the desired constant velocity as expeditiously as possible.

Thus, the present invention achieves several desirable results in that it usefully employs the kinetic energy of a driven member when it is being decelerated from its movement in one direction to initiate the acceleration of the driven member in the opposite direction for reciprocating movement. In addition, most importantly, the present invention significantly reduces the requirement for extra heavy duty driving means as may be required, for instance, of a two-phase, reversible electric motor of the general type described in the foregoing embodiments. In effect then, the problems of designing adequate capabilities into a servo mechanism system are largely resolved by meeting the less stringent requirements for driving the driven member at the desired constant velocity, rather than the significantly more demanding and costly braking requirements of the motor and the torque requirements as was commonly inherent in the application of prior art systems.

Figure 7:
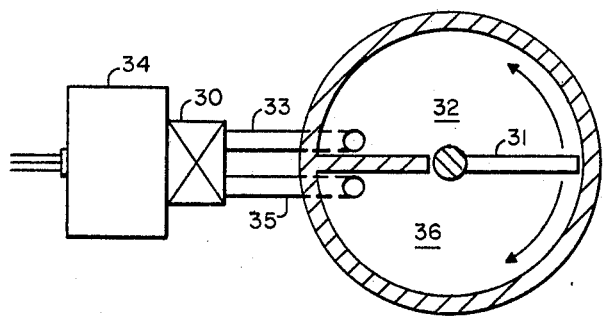
FIGURE 7 is a sectional view taken through the section 7—7 as shown in FIGURE 6.
Figure 6:
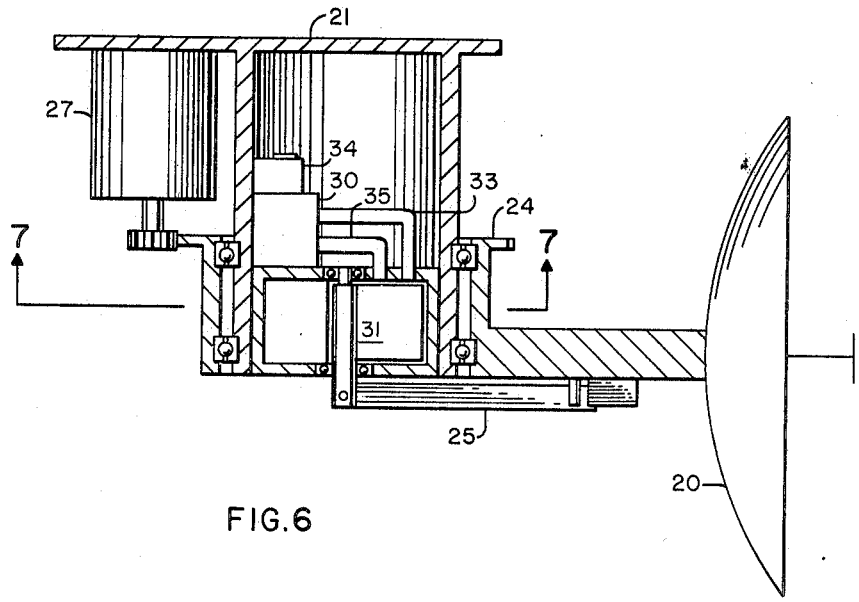
FIGURE 6 is a partially cross-sectional view of a variant embodiment of the present invention employing a hydraulic vane brake means as a reversing mechanism.

FIGURES 6 and 7 illustrate a variant embodiment of the present invention wherein a hydraulic vane brake is employed to reverse the driven assembly and set the resilient means of my invention. In FIGURES 6 and 7, like members of the structure bear the same numerical designations as in FIGURES 1 and 2. A fixed structure 21 supports a reversible electric motor drive means 27 which is mechanically linked to a driven assembly 24 through appropriate gear means to drive the radar antenna 20. A spring 25 is arranged in much the same manner as described previously in connection with FIGURES 1 and 2 and is fixedly supported relative to a vane 31 of the hydraulic vane brake. This arrangement is shown most clearly in the detail of FIGURE 7. The vane 31 rotates about the center axis of an enclosure which is separated into two interior portions 32 and 36. Conduits 33 and 35 connect the respective divided portions 32 and 36 and are in turn connected to a conventional valve assembly 30 which is under the control of a solenoid or similar appropriate actuating means 34. The arrangement described operates in the following manner. When the hydraulic valve assembly 30 is open, rotary motion of the vane 31 is freely effected because the hydraulic fluid may be transferred freely from the chamber 32, for example, through the conduit 33 and 35 and through open valve 30 to the chamber 36. Thus, the vane 31 and the spring 25 which is fixedly attached to it, are free to move when the valve assembly 30 is open, in the manner that the electro-magnetic brake means operated during the major portion of the reciprocating motion of the driven member when it is not electrically energized as was previously described in connection with the embodiment of FIGURES 1 and 2. When, however, the scan programmer reverses the phase of the control electrical energy, the electrical signals in lines 48 and 55 of FIGURE 4 are supplied to solenoid 34 to close valve 30 in the same manner that the electromagnetic brake was set in FIGURES 1, 2 and 4. The valve assembly 30 thus closes, effectively cutting off communication through the hydraulic connection or valve 30 between members 32 and 36 and the movement of vane 31 is inhibited. As a result, the spring 25, which is fixed to the vane 31, is resiliently deformed by reason of being sprung against the stops carried by the driven assembly 24. This deformation is graphically illustrated in FIGURE 3. Upon the driven member 20 reaching its predetermined limit of travel, the spring 25 imparts its force to accelerate the driven member in the opposite direction. When the spring 25 is unbent, then the valve assembly 30 is opened by release of the solenoid 34 in the manner previously described relative to switches 49 and 50 of FIGURE 4 and the driven assembly is rotated in the opposite direction by reversal of the control phase of electrical energy supplied to the motor 27.

Those skilled in the art will recognize that the resilient element of the present inventive concept can be furnished by a fluid enclosure of a resiliently compliant nature which will deform upon closure of the valve 30 and the consequent increased pressure on one side of the enclosure. The compliant deformation of the closure under fluid pressure such as that of air, gas or liquid effects an absorption of the kinetic energy of the driven assembly 24, storing of potential energy, and its release and utilization in aiding in reversal of the direction of the rotation of the driven member of the servomechanism system.

The embodiments of the present invention disclosed and described are of the rotating type; however, it will be evident that the concept of the present invention is equally as readily applicable to any servomechanism system including a member driven alternately in opposite directions between determinable limits of travel. Accordingly, such systems may include a driven member reciprocatingly driven in a straight path between two limit points as well as other configurations of variant simple and compound arcuate paths.

Having thus described my invention, I claim:

1. A dynamic servomechanism reversal system comprising,
   a driven member that is driven in opposed directions between the determinable limits of travel,
   reversible driving means operably connected for driving said driven member,
   a brake,
   control means for reversing said reversible driving means proximate to each of said determinable limits of travel and setting said brake,
   when reversed said driving means exerts reverse force that stops movement of the driven member and drives the driven means in the opposite direction,
   resilient means responsive to the setting of said brake for absorbing the kinetic energy of said driven member between the point of setting said brake and each of said determinable limits of travel, storing said energy, and in cooperation with the reverse force of the reversed driving means expending said energy in reversing the direction of drive of said driven member,
   said resilient means comprises a spring arranged to engage and oppose movement of said driven member when said brake is set,
   said brake comprises an electromagnetic coil on said spring and an adjacent electromagnetic coil on said driven means,
   said spring is mounted to be moved with said driven member and to be stopped relative to said driven member by said brake,
   and said spring is positioned to operably engage switch means for activating said brake.

References Cited

UNITED STATES PATENTS

| 2,812,484 | 11/1957 | De Westfelt | 318—275 |
| 3,333,443 | 8/1967 | Chung et al. | 318—282 |
| 2,875,464 | 3/1959 | Collins | 318—282 |

ORIS L. RADER, Primary Examiner

K. L. CROSSON, Assistant Examiner

U.S. Cl. X.R.

318—160, 261, 282; 343—757